(12) United States Patent
Ruggiero et al.

(10) Patent No.: US 12,329,310 B2
(45) Date of Patent: Jun. 17, 2025

(54) BEVERAGE PREPARATION MACHINE WITH CAPSULE RECOGNITION

(71) Applicant: SOCIETE DES PRODUITS NESTLE S.A., Vevey (CH)

(72) Inventors: Martino Ruggiero, Lonay (CH); Szabolcs Balasi, Chavannes-pres-Renens (CH)

(73) Assignee: Societe des Produits Nestle S.A., Vevey (CH)

( * ) Notice: Subject to any disclaimer, the term of this patent is extended or adjusted under 35 U.S.C. 154(b) by 1009 days.

(21) Appl. No.: 16/968,438

(22) PCT Filed: Jun. 15, 2018

(86) PCT No.: PCT/EP2018/065939
§ 371 (c)(1),
(2) Date: Aug. 7, 2020

(87) PCT Pub. No.: WO2019/154527
PCT Pub. Date: Aug. 15, 2019

(65) Prior Publication Data
US 2020/0397184 A1   Dec. 24, 2020

(30) Foreign Application Priority Data
Feb. 9, 2018  (EP) .................................. 18156197

(51) Int. Cl.
*A47J 31/44* (2006.01)
*A47J 31/52* (2006.01)
*G06N 3/08* (2023.01)

(52) U.S. Cl.
CPC ......... *A47J 31/4492* (2013.01); *A47J 31/521* (2018.08); *G06N 3/08* (2013.01)

(58) Field of Classification Search
CPC ....... G06N 3/08; A47J 31/4492; A47J 31/521; Y02W 90/10
See application file for complete search history.

(56) References Cited

U.S. PATENT DOCUMENTS

| | | | |
|---|---|---|---|
| 9,352,287 B2 | 5/2016 | Snider et al. | |
| 9,433,317 B2 | 9/2016 | Agon et al. | |
| 10,614,339 B2 | 4/2020 | Jiang | |
| 2005/0085690 A1* | 4/2005 | Tien ................... | A61B 1/00105 |
| | | | 348/E7.087 |

(Continued)

FOREIGN PATENT DOCUMENTS

| | | |
|---|---|---|
| CN | 101346729 A | 1/2009 |
| CN | 104602576 A | 5/2015 |

(Continued)

OTHER PUBLICATIONS

Chinese Office Action for Chinese Appl No. 201880087370 dated Feb. 11, 2023.

(Continued)

*Primary Examiner* — Dana Ross
*Assistant Examiner* — Kuangyue Chen
(74) *Attorney, Agent, or Firm* — K&L Gates LLP

(57) ABSTRACT

Machine for preparing and dispensing a beverage, such as tea, coffee, hot chocolate, cold chocolate, milk, soup or baby food, comprising a capsule recognition module for recognizing a capsule inserted in said machine at a capsule recognition position, the capsule recognition module comprising a camera for capturing an image of at least part of said capsule in said capsule recognition position; wherein the capsule recognition module comprises a neural network computing device, said neural network computing device being configured to determine a type of said capsule amongst a plurality of predefined capsule types on the basis of an image of at least part of said capsule captured by said camera.

22 Claims, 5 Drawing Sheets

(56) References Cited

U.S. PATENT DOCUMENTS

| | | | |
|---|---|---|---|
| 2012/0295234 A1* | 11/2012 | Rognon | B65D 85/8058 |
| | | | 434/127 |
| 2013/0061760 A1 | 3/2013 | Cahen et al. | |
| 2015/0132449 A1* | 5/2015 | Ye | A47J 31/407 |
| | | | 426/232 |
| 2015/0201790 A1* | 7/2015 | Smith | A47J 31/3695 |
| | | | 426/431 |
| 2015/0297022 A1 | 10/2015 | Guard et al. | |
| 2017/0032285 A1 | 2/2017 | Sharma et al. | |
| 2017/0068878 A1 | 3/2017 | Flick | |
| 2017/0147921 A1 | 5/2017 | Kasahara | |
| 2017/0219276 A1 | 8/2017 | Wang et al. | |
| 2018/0344075 A1* | 12/2018 | Zwicker | A47J 31/3633 |

FOREIGN PATENT DOCUMENTS

| | | | | |
|---|---|---|---|---|
| CN | 106778912 | | 5/2017 | |
| CN | 106778912 A | * | 5/2017 | A47J 37/0629 |
| CN | 107535024 A | | 1/2018 | |
| CN | 107595102 | | 1/2018 | |
| CN | 107977456 A | * | 5/2018 | G06F 17/30539 |
| EP | 3175745 | | 6/2017 | |
| EP | 3275345 | | 1/2018 | |
| JP | H04135209 A | | 5/1992 | |
| JP | 1028647 | | 2/1998 | |
| JP | H1028647 A | * | 2/1998 | |
| JP | 2017151262 A | | 8/2017 | |
| WO | 2012123440 | | 9/2012 | |
| WO | WO-2012123440 A1 | * | 9/2012 | A47J 31/369 |

OTHER PUBLICATIONS

Australian Office Action for Appl No. 109709AUP00 dated Jan. 10, 2025, 4 pages.

Chinese Office Action for Appl No. 201880087370.X dated Jul. 28, 2023.

* cited by examiner

BEVERAGE PREPARATION MACHINE WITH CAPSULE RECOGNITION

CROSS REFERENCE TO RELATED APPLICATIONS

The present application is a National Stage of International Application No. PCT/EP2018/065939, filed on Jun. 15, 2018, which claims priority to European Patent Application No. 18156197.8, filed on Feb. 9, 2018, the entire contents of which are being incorporated herein by reference.

FIELD OF THE INVENTION

The field of the invention pertains to beverage preparation machines using capsules of an ingredient of the beverage to be prepared. The field of the invention pertains in particular to beverage preparation machines using capsules and configured to automatically recognize a type of a capsule inserted in the machine in order for example to adapt the beverage preparation parameters to the recognized capsule type.

For the purpose of the present description, a "beverage" is meant to include any human-consumable liquid substance, such as tea, coffee, hot or cold chocolate, milk, soup, baby food, etc. A "capsule" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient. The capsule may contain an amount of ingredient for preparing a single beverage portion or a plurality of beverage portions.

BACKGROUND ART

Certain beverage preparation machines use capsules containing ingredients to be extracted or to be dissolved and/or ingredients that are stored and dosed automatically in the machine or else are added at the time of preparation of the drink. Some beverage machines possess filling means that include a pump for liquid, usually water, which pumps the liquid from a source of water that is cold or indeed heated through heating means, e.g. a thermoblock or the like.

Especially in the field of coffee preparation, machines have been widely developed in which a capsule containing beverage ingredients is inserted in a brewing device.

Brewing devices have been developed to facilitate insertion of a "fresh" capsule and removal of the capsule upon use. Typically, the brewing devices comprise two parts relatively movable from a configuration for inserting/removing a capsule to a configuration for brewing the ingredient in the capsule.

The actuation of the movable part of the brewing device may be manual as disclosed in WO 2009/043630, WO 01/15581, WO 02/43541, WO 2010/015427, WO 2010/128109, WO 2011/144719 and WO 2012/032019. Various handle configurations are disclosed in EP 1867260, WO 2005/004683, WO 2007/135136, WO 2008/138710, WO 2009/074550, WO 2009/074553, WO 2009/074555, WO 2009/074557, WO 2009/074559, WO 2010/037806, WO 2011/042400, WO 2011/042401 and WO 2011/144720. Integrations of such arrangements into beverage machines are disclosed in WO 2009/074550, WO 2011/144719, EP2014195046, EP2014195048 and EP2014195067.

The actuation of the movable part of the brewing device may be motorized. Such a system is for example disclosed in EP 1 767 129. In this case, the user does not have to provide any manual effort to open or close the brewing device. The brewing device has a capsule insertion passage provided with a safety door assembled to the movable part of the brewing device via a switch for detecting an undesired presence of a finger in the passage during closure and prevent injuries by squeezing. Alternative covers for a capsule insertion passage are disclosed WO 2012/093107 and WO 2013/127906. Different motorization systems are disclosed in WO 2012/025258, WO 2012/025259 and WO 2013/127476.

For allowing the user to interact with such machines, for providing operation instructions to the machine or obtaining feed-back therefrom, various systems have been disclosed in the art, for instance as mentioned in the following references: AT 410 377, CH 682 798, DE 44 29 353, DE 202 00 419, DE 20 2006 019 039, DE 2007 008 590, EP 1 448 084, EP 1 676 509, EP 08155851.2, FR 2 624 844, GB 2 397 510, U.S. Pat. Nos. 4,377,049, 4,458,735, 4,554,419, 4,767,632, 4,954,697, 5,312,020, 5,335,705, 5,372,061, 5,375,508, 5,645,230, 5,685,435, 5,731,981, 5,836,236, 5,959,869, 6,182,555, 6,354,341, 6,759,072, US 2007/0157820, WO 97/25634, WO 99/50172, WO 2004/030435, WO 2004/030438, WO 2006/063645, WO 2006/090183, WO 2007/003062, WO 2007/003990, WO 2008/104751, WO 2008/138710, WO 2008/138820, WO 2010/003932, WO 2011/144720 and WO 2012/032019.

To facilitate the operating of the machine, it is possible to identify automatically the capsule supplied to the machine and then handle and extract the capsule automatically, as for instance disclosed in WO 2012/123440.

There is still a need to improve the beverage dispensing with machines that reliably identify capsules automatically.

SUMMARY OF THE INVENTION

The invention relates to a machine for preparing a beverage. The beverage preparation machine can be an in-home or out of home machine.

The machine may be for the preparation of coffee, tea, chocolate, cacao, milk, soup, baby food, etc.

The beverage preparation typically includes the mixing of a plurality of beverage ingredients, e.g. water and milk powder, and/or the infusion of a beverage ingredient, such as an infusion of ground coffee or tea with water. One or more of such ingredients may be supplied in loose and/or agglomerate powder form and/or in liquid form, in particular in a concentrate form. A carrier or diluents liquid, e.g. water, may be mixed with such ingredient to form the beverage. Typically, a predetermined amount of beverage is formed and dispensed on user-request, which corresponds to a portion (e.g. a serving). The volume of such portion may be in the range of 25 to 200 ml and even up to 300 or 400 ml, e.g. the volume for filling a cup, depending on the type of beverage. Formed and dispensed beverages may be selected from ristrettos, espressos, lungos, cappuccinos, latte macchiato, café latte, americano coffees, teas, etc. In particular, a coffee machine may be configured for dispensing espressos, e.g. an adjustable volume of 20 to 60 ml per portion, and/or for dispensing lungos, e.g. a volume in the range of 70 to 150 ml per portion.

The machine of the invention has an extraction unit for extracting a beverage ingredient capsule in an extraction chamber to form the beverage. The unit has a first part and a second part that are relatively movable between a distant position for inserting a capsule in and/or removing a capsule from the extraction chamber, and a close position for securing and extracting such capsule in the extraction chamber. In the close position the first and second parts typically delimit the extraction chamber.

The capsule can comprise a capsule body, e.g. a generally straight, tapered or disc shaped body. The capsule can have a circular peripheral annulus flange, e.g. a flexible or rigid flange, extending from a peripheral part, e.g. an edge or face, of the capsule body. The capsule may contain a flavoring ingredient for preparing tea, coffee, hot chocolate, cold chocolate, milk, soup or baby food.

At least one part of the first and second parts may delimit a cavity for receiving the ingredient e.g. within a capsule, such as a tapered cavity, e.g. a conical or pyramidal cavity, or a straight cavity, e.g. a cylindrical or trapezoidal cavity, or a disc shaped cavity. Such cavity may extend along an axis that is generally collinear with a direction of relative movement of the first and second parts. The extraction chamber is then delimited on one side by such cavity.

The other part of these first and second parts may be delimited by another cavity and/or include an extraction plate, such as a plate provided with piercing elements for opening a flow-through face of the capsule or a non-intrusive plate for cooperating with a pre-opened or a self-opening flow-through face of the capsule.

Examples of extraction units are disclosed in WO 2008/037642 and WO 2013/026843.

At least one of these parts can have a capsule opener e.g. one or more capsule piercers.

The capsule can also include a self-opening mechanism. Self-opening capsules are for instance disclosed in CH 605 293 and WO 03/059778.

When closed capsules are used, the first and second parts may include a capsule opener such as blades and/or a tearing tool, e.g. a plate with a tearing profile, for instance as known from Nespresso™ machines or as disclosed in EP 0 512 470, EP 2 068 684 and WO 2014/076041 and the references cited therein.

At least one of the parts may have an opening for an inflow of liquid to be mixed with an ingredient contained in such capsule.

The machine includes a control unit for controlling the extraction unit to extract such capsule. The control unit can be powered by the mains e.g. via an electric cord.

The machine has an outlet for dispensing the beverage formed by extracting such capsule to a user-receptacle, such as a cup or a mug, located in a receptacle placing area.

A flavoured beverage may be prepared by circulating (by means of a liquid driver, e.g. a pump) a carrier liquid, such as water, into the capsule to flavour the liquid by exposure to a flavouring ingredient held in the capsule, e.g. along an extraction direction that may be generally parallel to the direction of relative movement of the first and second parts or to a longitudinal or central direction of the extraction.

For instance, the user receptacle can be placed on a receptacle support to collect the beverage.

The receptacle support can be formed by an external placement support on which such machine is located.

The receptacle support may be formed by a support comprised by the machine, e.g. a movable or removable machine support.

The receptacle placing area can be associated with a machine recipient support for supporting such user-recipient under the outlet. The support can be: associated with a drip tray e.g. a drip tray supporting the support; and/or movable relative to the housing vertically under the outlet and/or away from under the outlet for enabling a placement of user-recipients of different heights under the outlet. Examples of suitable recipient supports are disclosed in EP 0 549 887, EP 1 440 639, EP 1 731 065, EP 1 867 260, U.S. Pat. Nos. 5,161,455, 5,353,692, WO 2009/074557, WO 2009/074559, WO 2009/135869, WO 2011/154492, WO 2012/007313, WO 2013/186339, WO 2016/096705, WO 2016/096706 and WO 2016/096707.

In embodiments, the outlet can be fixed to or formed by or mounted to or mounted in:
- a machine head that has a deployed position in which the outlet is located above the receptacle placing area and a collapsed position in which the outlet is retracted within an external machine main housing, such as a machine head driven inwards into and outwards out of the main housing by at least one of the first and second parts or by an actuator controlled by the control unit; and/or
- a movable beverage guide that has a beverage dispensing configuration to dispense beverage to the receptacle placing area and a beverage stop configuration to prevent dispensing of beverage to the receptacle placing area, e.g. by draining residual beverage from the guide over a guide edge to a waste receptacle, such as a beverage guide driven between the dispensing configuration and the stop configuration by at least one of the first and second parts or by a (or the above) machine head or by an actuator controlled by the control unit.

For instance, the machine is provided with a machine head as disclosed in WO 2017/037212 and in WO 2017/037215.

Examples of suitable waste receptacles for carrying out the present invention are disclosed in EP 1867260, WO 2009/074559, WO 2009/135869, WO 2010/128109, WO 2011/086087, WO 2011/086088, PCT/EP2017/050237 and WO 2017/037212.

The directing fluid guide can be entirely confined in the main body and/or the machine head.

Details of directing fluid guides that are suitable or adaptable for carrying out the present invention are disclosed in WO 2006/050769, WO 2012/072758, WO 2013/127907, WO 2016/083488 and WO 2017/037212.

The extraction unit can include a capsule feeder for feeding a capsule to the extraction chamber, the feeder having a capsule dispenser with a release configuration for releasing such capsule from the feeder towards the extraction chamber, and a retain configuration for retaining such capsule away from the extraction chamber.

The capsule dispenser can be formed by a mechanical and/or magnetic capsule gate, such as a capsule holder e.g. having a shape complementary to and matching at least part of an outer shape of such capsule.

The capsule holder may have a capsule gate that is movable, such as pivotable and/or translatable, between a position obstructing a transfer towards the extraction chamber and a position clearing the transfer towards the extraction chamber.

The capsule holder may have an actuator for passing from the retain configuration to the release configuration and vice versa, such as an actuator controlled by the control unit.

The capsule holder may be formed by at least a part of the first part and/or of the second part of the extraction unit, for example by a surface and/or an edge of the first and/or second part obstructing a transfer of the capsule towards the extraction chamber when the first and second parts are in the close position and/or when they are in an intermediary position between the distant position and the close position.

The capsule holder is then actuated simultaneously with the first and second parts of the extraction unit.

Immediately after releasing a capsule towards the extraction chamber, the capsule dispenser may be passed from the release configuration to the retain configuration so that access towards the extraction chamber is only provided when needed to release a capsule.

The capsule feeder may include a passage for guiding such capsule to the extraction chamber into a predetermined capsule orientation for its entry into the extraction chamber such as a passage associated with capsule immobilizer for immobilizing such capsule between the first and second parts in their distant position prior to relatively moving them into their close position.

The interaction between the first and second parts (and optionally the capsule guiding passage) and an ingredient capsule may be of the type disclosed in WO 2005/004683, WO 2007/135135, WO 2007/135136, WO 2008/037642 and WO 2013/026856.

The control unit may control the capsule dispenser to release such capsule from the feeder when the first and second parts are in the distant position or moving towards the distant position, for an entry of such capsule into the extraction chamber when the first and second parts are brought back into their close position.

The control unit may control the capsule dispenser to retain such capsule at the feeder and away from the extraction chamber when the first and second parts are:
  in the close position or relatively moving thereto; or
  in the distant position and about to relatively move to the close position so as to leave insufficient time for such capsule, if it were released from the dispenser, to be received into the extraction chamber prior to the first and second parts reaching the close position.

The capsule feeder may include or be associated with a capsule sensor connected to the control unit, the control unit being configured to bring or maintain the capsule dispenser in its retain configuration when the capsule sensor senses no such capsule on or at the capsule dispenser. Examples of capsule sensors are for example disclosed in WO 2012/123440, WO 2014/147128, WO 2015/173285, WO 2015/173289, WO 2015/173292, WO 2016/005352 and WO 2016/005417.

The control unit can be configured to control the actuator so that the first and second parts are moved by the actuator: from the close position into the distant position and from the distant position into the close position after a predetermined period of time starting for example from a beverage preparation triggering event such as for example capsule detection, capsule recognition, user actuation of the machine's user interface, etc., or a combination thereof, for instance a predetermined period of time in the range of 3 to 15 sec, such as 5 to 12 sec, e.g. 7 to 10 sec.

Examples of such parts that are relatively moved by an actuator (e.g. a motor) are disclosed in EP 1767129, WO 2012/025258, WO 2012/025259, WO 2013/127476 and WO 2014/056641.

For instance, the first part and the second part are relatively movable generally along a straight axis by the actuator from the close to the distant positions and/or vice versa.

The machine may include a liquid supplier for supplying liquid, e.g. water, into the extraction chamber, the liquid supplier being connected to and controlled by the control unit to supply such liquid into the extraction chamber and to interrupt such supply, automatically and/or manually via a user-interface connected to the control unit and/or when a removal of such receptacle is detected by the detecting arrangement. For instance, the liquid supplier includes one or more of: a source of said liquid, such as a liquid tank or a liquid connector for connection to an external liquid provider; one or more liquid tubes for guiding such liquid to the extraction chamber; a liquid driver, such as a pump e.g. a solenoid pump (reciprocating piston pump) or a peristaltic pump or a diaphragm pump, for driving such liquid into extraction chamber; and a thermal conditioner, e.g. a heater and/or a cooler, such as an inline thermal conditioner, e.g. an inline flow conditioner, for thermally conditioning such liquid.

Examples of suitable liquid sources, e.g. tanks or connectors, are disclosed in WO 2016/005349, EP2015194020.2, PCT/EP2017/050237 and the references cited therein.

The thermal conditioner may be a boiler or a thermoblock or an on demand heater (ODH), for instance an ODH type disclosed in EP 1 253 844, EP 1 380 243 and EP 1 809 151.

Examples of pumps and their incorporation into beverage machines are disclosed in WO 2009/150030, WO 2010/108700, WO 2011/107574 and WO 2013/098173.

The control unit may be configured to control the liquid supplier to supply automatically the liquid into the extraction chamber when:
  the first and second parts have reached their close position with the capsule housed in the extraction chamber upon moving the parts from the distant to the close positions so as to combine said liquid with an ingredient contained in the capsule and form the beverage for dispensing via the outlet, optionally after sensing with a (or the above) capsule sensor a supply of such capsule to the unit; and/or
  the first and second parts have reached their close position without any capsule housed in the extraction chamber so as to rinse or clean at least part of the unit and optionally the outlet, the liquid supplier being for instance configured to supply the liquid at a rinsing or cleaning temperature that is different to the temperature of such liquid for forming a beverage, e.g. by brewing.

In a particular embodiment, it is also contemplated to deliver cold or cooled beverages.

The control unit can be configured to control the liquid supplier not to supply automatically the liquid into the extraction chamber when the first and second parts have reached their close position without any (for instance detected or recognised) capsule housed in the extraction chamber. For instance, the control unit is configured to control the liquid supplier to supply the liquid into the extraction chamber upon sensing a corresponding manual user-input on a user-interface connected to the control unit.

The control unit may have an end-of-extraction management program which is run automatically when the liquid supply is interrupted (e.g. when a predetermined extraction process is over or is detected as faulty) to:
  immediately relatively move the first and second parts into their distant position so as to remove any capsule from inbetween the first and second parts; or
  to maintain the first and second parts in the close position during a predetermined period of time, e.g. in the range of 1 to 5 sec such as 2 to 3 sec, for allowing a manual request, e.g. via a user-interface connected to the control unit, to supply via the liquid supplier an additional amount of liquid into the extraction chamber and, in the absence of such manual request during the predetermined period of time, to relatively move the first and second parts into their distant position so as to remove any capsule from inbetween the first and second parts, for instance to remove such capsule into a used-capsule collector formed by a (or the above) waste receptacle.

For instance, prior to moving the first and second parts into their close position, the parts may remain into their distant position for a predetermined period of time, such as a period of time in the range of 1 to 6 sec. e.g. 2 to 4 sec, for allowing an insertion of a new capsule inbetween the first and second parts prior to relatively moving them into their close position with the new capsule housed in the extraction chamber for an extraction of the new capsule.

Hence, a user can request the dispensing of two (or more) portions of beverages (e.g. a double expresso) into the same user-recipient.

According to the invention, the machine for preparing and dispensing a beverage, such as tea, coffee, hot chocolate, cold chocolate, milk, soup or baby food, comprises:
- an extraction unit for extracting a beverage ingredient capsule to form said beverage, e.g. a unit having a first part and a second part that are relatively movable between a distant position for inserting and/or removing a capsule and a close position, such as a close position in which the first and second parts delimit an extraction chamber, for securing and extracting such capsule, optionally at least one of said parts has a capsule opener e.g. one or more capsule piercers and/or at least one of said parts has an opening for an inflow of liquid to be mixed with an ingredient contained in such capsule;
- a control unit for controlling the extraction unit to extract such capsule, such as a control unit powered by the mains e.g. via an electric cord;
- an outlet for dispensing the beverage formed by extracting such capsule to a user-receptacle, such as a cup or a mug, located in a receptacle placing area, such as on a receptacle support e.g. an external placement support on which such machine is located or a machine support e.g. a movable or removable machine support, to collect said beverage,
- a capsule recognition module for recognizing a capsule inserted in the machine at a capsule recognition position, the capsule recognition module comprising a camera for capturing an image of at least part of the capsule in the capsule recognition position;
- wherein the capsule recognition module comprises a neural network computing device, the neural network computing device being configured to determine a type of the capsule amongst a plurality of predefined capsule types on the basis of an image of at least part of the capsule captured by the camera.

The plurality of predefined capsule types for example comprises a capsule type corresponding to capsules unknown to the capsule recognition module.

The computing device for example comprises a computing device, such as a microcontroller, a microprocessor or any other appropriate computing device, and a neural network computer program implementing a neural network when run on the computing device. The neural network is for example a convolutional neural network.

In embodiments, the machine further comprises a network interface, for example a wired or wireless network interface. The neural network computing device then is for example configurable and/or can be updated remotely over the network interface.

In embodiments, the capsule recognition module comprises at least one source of light, for example at least one LED, to light up a capsule at the capsule recognition position and a diffusor for diffusing the light of the at least one source of light towards the capsule recognition position. The diffusor preferably forms a tapered cavity extending from the camera to the capsule recognition position and opens towards the capsule recognition position.

According to the invention, a method of configuring a neural network computing device of such a machine comprises:
- training a neural network computer program outside of the neural network computing device by inputting several images of capsules of the predetermined types until the neural network correctly determines the type of each next capsule image with a probability higher than a predetermined threshold;
- copying the trained neural network computer program into the neural network device of the beverage preparation machine.

According to the invention, a method of updating a neural network computing device of such a machine comprises:
- training a neural network computer program outside of the neural network computing device by inputting several images of capsules of the predetermined types, the predetermined types comprising a new, previously unknown type, until the neural network correctly determines the type of each next capsule image with a probability higher than a predetermined threshold;
- copying the trained neural network computer program into the neural network device of the beverage preparation machine.

The step of copying the trained neural network computer program into the neural network computing device of the machine may be performed over a data network, for example over the internet, for example from a remote server to said neural network computing device.

The present invention further relates to a neural network computer program for determining a type of a capsule amongst a plurality of predefined capsule types, on the basis of an image of at least part of said capsule captured by a camera of a beverage preparation machine.

The neural network computer program preferably implements a convolutional neural network when run on a computing device. In embodiments, the convolutional neural network comprises at least one convolutional layer and at least one fully connected classification layer. In embodiments, the convolutional neural network for example comprises three convolutional layers, each followed by a pooling layer, and a two-layer fully-connected classifier.

The use of an adequately trained neural network for recognizing a type of a capsule allows a rapid determination of the capsule type.

It furthermore avoids image comparison processes in the beverage preparation machine that require high computational resources and large storage for storing sample images of each capsule type.

BRIEF DESCRIPTION OF THE DRAWINGS

The invention will now be described with reference to the schematic drawings, wherein.

DETAILED DESCRIPTION

Figure 1:
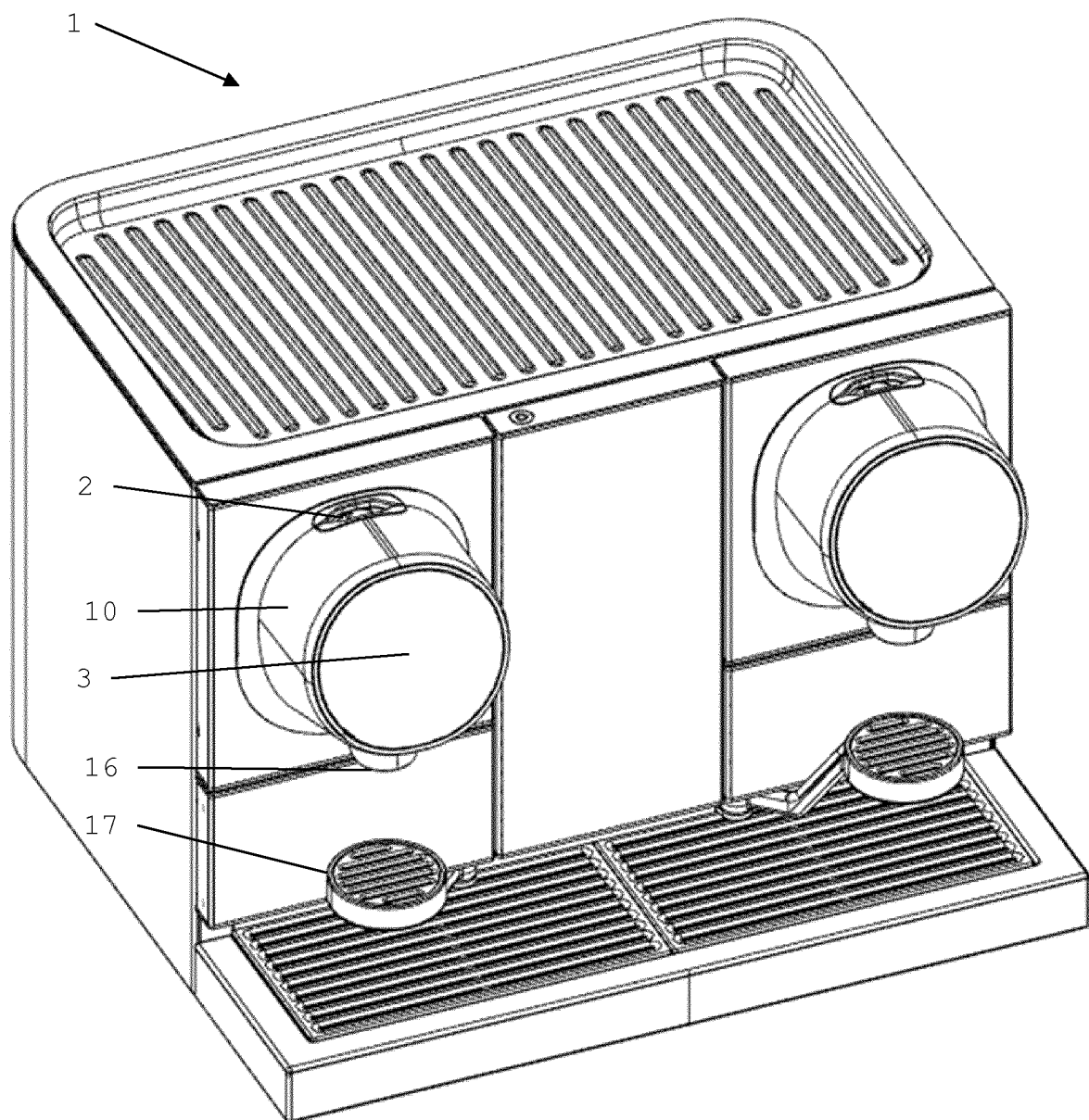
FIG. 1 is a perspective view of a machine according to the invention.

FIG. 1 illustrates an exemplary embodiment of a beverage machine 1 according to the invention for preparing and dispensing a beverage, such as tea, coffee, hot chocolate, cold chocolate, milk, soup or baby food. The ingredient may be supplied in the form of an ingredient capsule, e.g. of the type described above under the header "Field of the Invention".

Machine 1 includes an extraction unit for extracting a beverage ingredient capsule to form a beverage. The extraction unit for example has a first part and a second part, preferably located inside the machine housing and thus not visible in FIG. 1, that are relatively movable between a distant position for inserting and/or removing a capsule and a close position, such as a close position in which the first and second parts delimit an extraction chamber, for securing and extracting the capsule. For instance, at least one of the parts has a capsule opener e.g. one or more capsule piercers and/or at least one of the parts has an opening for an inflow of liquid to be mixed with an ingredient contained in the capsule.

Machine 1 includes a control unit located preferably inside the machine housing, for controlling the extraction unit to extract the capsules. The control unit may be powered by the mains, e.g. in a known manner via an electric cord or by a DC source, e.g. battery such as a car battery or portable battery or machine battery.

Machine 1 has an outlet 16 for dispensing beverages formed by extracting such capsules to a user-receptacle, not represented, such as a cup or a mug, located in a receptacle placing area 17 to collect the beverage.

In embodiments, outlet 16 is for example fixed to or formed by or mounted to or mounted in a machine head 10, wherein the outlet 16 is located above the receptacle placing area 17.

The extraction unit includes an actuator configured to relatively move the first and second parts between their relatively distant and close positions. The actuator is connected to the machine's control unit and controlled thereby to relatively move the first and second parts.

The control unit is connected to an input device for initiating and/or controlling the extraction unit. According to the invention, the input device comprises for example a user interface 3, for example a touch screen.

Figure 2:
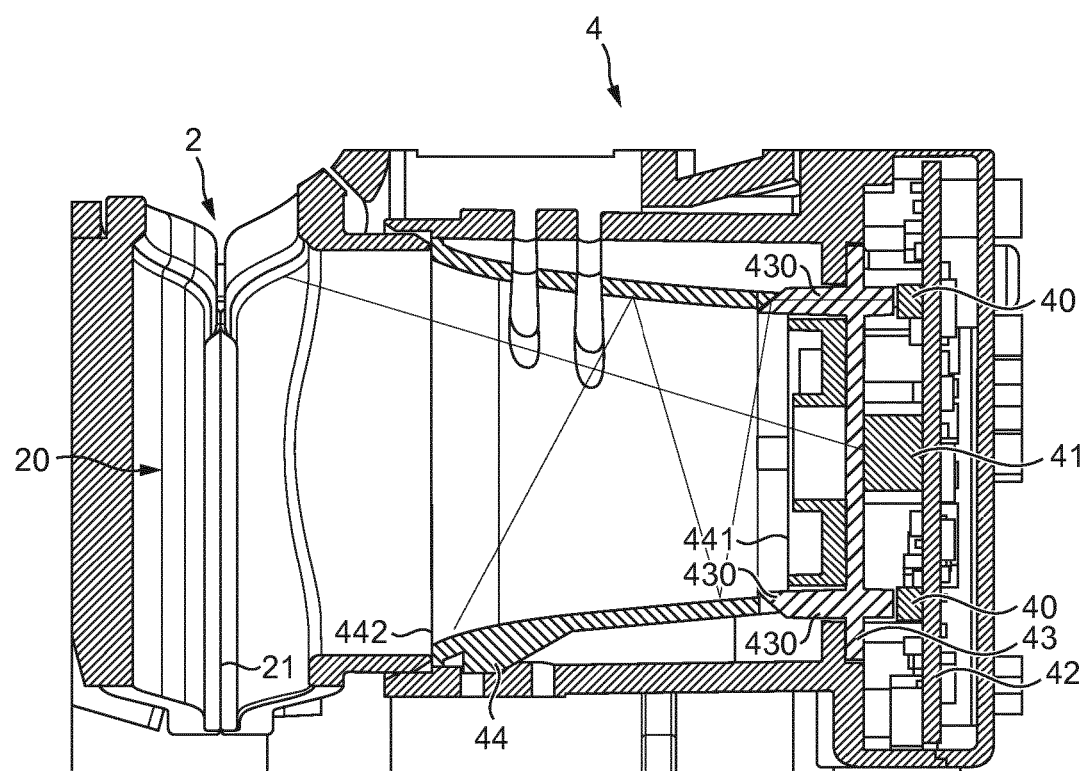
FIG. 2 is a cross-sectional view of a capsule recognition module according to an embodiment of the invention.
Figure 3:
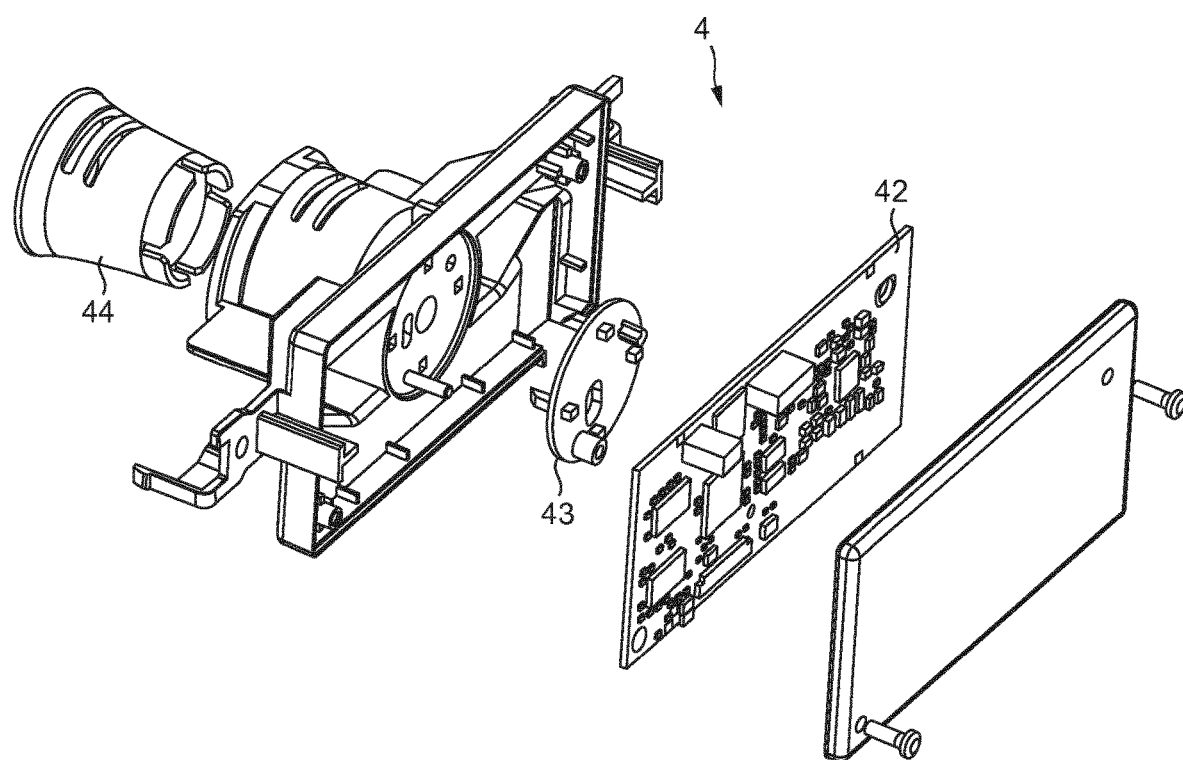
FIG. 3 is an exploded view of the capsule recognition module of FIG. 2.

With reference to FIG. 2, the extraction unit may include a capsule feeder 2 for feeding a capsule to the extraction chamber, and a capsule recognition module 4 to recognise a type of a capsule fed to the extraction chamber. The capsule recognition module 4 for example recognizes a type of a capsule while such capsule is in a capsule recognition position 20 within the capsule feeder 2, and before it is fed to the extraction chamber, which is not represented in the figures and for example located below the capsule recognition position 20.

The machine preferably further comprises a capsule sensor, for example a mechanical and/or optical sensor, not represented, for sensing the presence of a capsule approaching and/or located in the capsule recognition position 20.

The capsule feeder 2 can have retaining means, not represented, to hold a capsule at the capsule recognition position 20. The retaining means typically have a release configuration for releasing the capsule from the capsule recognition position 20 towards the extraction chamber, for example under the action of gravity, and a retain configuration for retaining the capsule away from the extraction chamber, for example above the extraction chamber, in the capsule recognition position 20.

The capsule feeder 2 can have a passage for guiding the capsule to the extraction chamber into a predetermined capsule orientation for its entry through the capsule recognition position, into the extraction chamber. The passage for example comprises guiding grooves 21 in which a flange of the capsule is inserted while the capsule travels through the passage, thereby keeping the capsule in a predetermined orientation preferably appropriate for its recognition by the capsule recognition module 4 and/or its insertion into the extraction chamber.

The control unit may control the retaining means to release the capsule from the capsule recognition position 20 when the first and second parts of the extraction unit are in the distant position or when they are moving towards the distant position, for an entry of the capsule into the extraction chamber when the first and second parts are brought back into their close position. The retaining means for example comprise a surface and/or an edge of the first and/or of the second part of the extraction unit.

The capsule recognition module 4 is preferably connected to the control unit and configured to recognize a type among predetermined capsule types of a capsule located in the capsule recognition position 20.

As explained in more details further below, the capsule recognition module 4 recognizes a type of a capsule by capturing an image of said capsule and feeding it as input to a trained neural network computing device.

The control unit is for example configured to control the liquid supplier of the machine according to a liquid supply program associated with the capsule type, such as a liquid supply program with one or more adjusted supplied liquid parameters selected from a liquid temperature, flow, pressure and volume that is/are constant or variable during an extraction of the recognised capsule. For instance, the capsule type can be selected from a plurality of known, predetermined capsule types extractible in the machine's extraction chamber.

The capsule recognition module 4 is preferably positioned along the passage of the feeder 2, at the height of the capsule recognition position 20.

During use of the machine of the invention, the following steps can be carried out:
- placing a receptacle in the receptacle placing area;
- inserting a capsule in the capsule feeder 2;
- recognizing a type of the capsule by the capsule recognition module 4;
- relatively moving the first and second parts of the extraction unit into their distant position automatically, semi-automatically or manually;
- supplying the capsule to the extraction chamber;
- relatively moving the first and second parts into their close position to position the capsule in the extraction chamber;
- extracting the capsule in the extraction chamber applying extraction parameters determined on the basis of the recognised type of the capsule to prepare a beverage; and
- dispensing the prepared beverage via the outlet 16 to the receptacle.

According to the invention, the capsule recognition module 4 is configured to determine a type of a capsule inserted in the beverage preparation machine at the capsule recognition position 20 by capturing an image of said capsule and processing said image by a neural network computing device.

The beverage preparation machine typically allows extracting capsules of different types in order to prepare different beverages and/or different beverage styles. The different types of capsules extractible in the extraction chamber for example correspond to different ingredients contained therein and/or different ingredient conditioning.

In embodiments, each type of capsule corresponds to a particular type of coffee, which differs from the coffee contained in capsules of other types for example, but not exclusively, in one or more of its origin, its roasting degree, its grounding level, its quantity contained in the capsule and/or its caffeine content. Alternatively or in combination thereof, different types of capsules extractible in the beverage preparation machine 1 correspond to ingredients for the preparation of different beverages, such as for example coffee, milk, soup, baby milk, tea, cold beverages, etc.

Preferably, each type of capsule is associated with a specific aspect of the capsule, for example a colour or combination of colours, specific characters and/or drawings formed on the surface of the capsule, etc., thereby allowing for example a user visually differentiating capsules of different types. The neural network device of the capsule recognition module 4 comprises a neural network program preferably previously trained to recognize the type of a capsule based on a digital image of at least part of said capsule. The neural network device typically comprises a data processor for running the neural network program.

The machine 1 may be configured to extract each capsule using preparation parameters specific to the particular type of the capsule. The preparation parameters for example include one or more of: a carrier liquid temperature, a carrier liquid volume, an extraction time, a carrier liquid pressure, a carrier liquid type, a number of successive preparation phases, etc. The preparation parameters for use with each type of capsule extractible in the machine 1 are preferably stored in an internal or external data storage means connected or connectable with the control unit and/or with the capsule recognition module 4. The appropriate preparation parameters for a particular capsule are selected on the basis of the capsule type determined by the capsule recognition module 4, and they are used by the control unit for controlling the extraction of the recognised capsule.

The machine 1 may also be configured to store and/or to transmit to an external terminal and/or server information about the type of each capsule extracted in the machine, in order for example to monitor the capsule consumption at the machine 1.

With reference to FIG. 2, the capsule recognition module 4 comprises a source of light, for example one or more white LEDs 40 or any other appropriate source of light, preferably with known and definite spectrum, a camera 41, for example a CCD camera, and a neural network computing device, not represented in the figures, for example in the form of a microcontroller, a microprocessor or another appropriate computing device configured to run a neural network computer program. The capsule recognition module 4 preferably further comprises a controller, not represented on the figures, for example but not exclusively an ASIC or a programmable microcontroller, for controlling the source of light, the camera 41 and the neural network computing device. Alternatively, the neural network computing device and the controller of the capsule recognition module are the same component or integrated as a single component. The controller of the capsule recognition module 4 is for example configured for switching the source of light on and off and/or for receiving and handling the signals from the camera 41. The source of light, the camera 41, the neural network computing device and the module's controller are preferably attached, for example soldered, to an electronic board 42, typically a PCB, providing them in a known manner with the necessary power and data connections and/or interconnections. The controller is preferably connected to and controlled by the control unit of the machine 1.

Preferably, the capsule recognition module 4 further comprises a light guide 43 and a diffusor 44 for guiding light emitted by the source of light towards the capsule recognition position 20 and/or for limiting the light received by the camera 41 preferably to the light reflected by a capsule located at the capsule recognition position 20 in order to avoid sensing parasitic light, for example environmental light.

Preferably, the source of light is an extended source of light. In embodiments, the source of light for example comprises a plurality of LEDs 40 that are preferably equally distributed, for example around the camera 41. In the illustrated embodiments, the source of light for example comprises four LEDs 40 distributed around the camera 41, of which only two are schematically illustrated in FIG. 2. Extended sources of light of other types and/or distributions are however possible within the frame of the invention, such as for example a ring-shaped source of light encircling the camera 41.

The light guide 43 is for example in the form of an essentially transparent cover associated with, for example at least partly covering, the light source 49 and/or the camera 41. The cover comprises for example openings or other guiding means for guiding the light to and from the capsule recognition position 20, through the diffusor 44. In the embodiment schematically illustrated on FIG. 2, the light guide 43 for example comprises light guiding protrusions 430, each protrusion 430 extending from a LED 40 of the light source 49 towards the diffusor 44 in order to guide light emitted by the LED 40 into the diffusor 44.

The light guide 43 and/or the diffusor 44 are preferably configured such as to avoid light emitted by the light source 49 to directly reach the capsule recognition position 20. In the embodiment illustrated in FIG. 2, the light guiding protrusions 430 are for example configured such that a majority of the guided light is directed into the diffusor 44 against a portion of the inner wall of the diffusor where it will be reflected, hence in a direction transverse to the longitudinal axis of the diffusor 44 that extends from the camera 41 to the capsule position recognition 20. The extremities of the light guiding protrusions 430 on the side of the diffusor 44 are for example bevelled at 45° such that most of the guided light is reflected on the bevelled surface and directed towards the diffusor 44 at an angle essentially perpendicular to the longitudinal axis of the diffusor 44.

In the illustrated example, the diffusor 44 comprises a preferably light coloured, for example white, and opaque element forming a truncated conical cavity opening towards the capsule recognition position 20. Other shapes are however possible for the diffusor within the frame of the invention. The diffusor however preferably forms a tapered cavity extending from the camera 41 to the capsule recognition position, opening preferably towards the capsule recognition position.

The diffusor 44 is preferably configured to avoid reflections on a capsule located at the capsule recognition position 20 and/or in the capsule recognition module that may lead to faulty lighting of the capsule and thus possibly to faulty capsule recognition. The inner surface of the diffusor 44 is for example textured in order to improve the diffusion of the light traveling from the light source 49 to the capsule recognition position 20.

The diffusor 44 optionally comprises openings and/or protruding elements that interrupt and/or deviate the light rays emitted from the light source 49 in the direction of the capsule recognition position 20. Alternatively or in combination thereof, the diffusor is made of a transparent or semi-transparent material and light from the light source 49 is guided, for example by the light guide, through the walls of the diffusor, thus resulting in light being refracted in a distributed manner out of the diffusor wall and into the cavity in front of the capsule recognition position.

Figure 4:
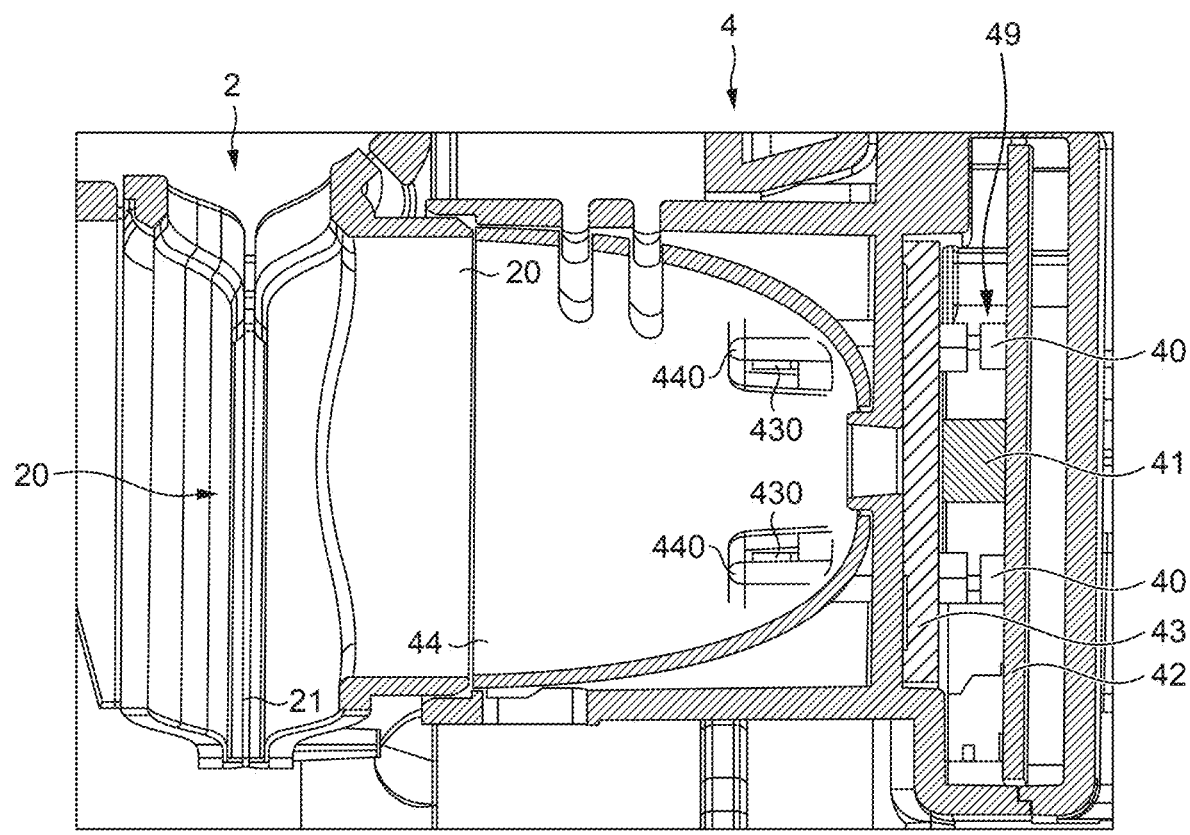
FIG. 4 is a cross-sectional view of a capsule recognition module according to another embodiment of the invention.
Figure 5:
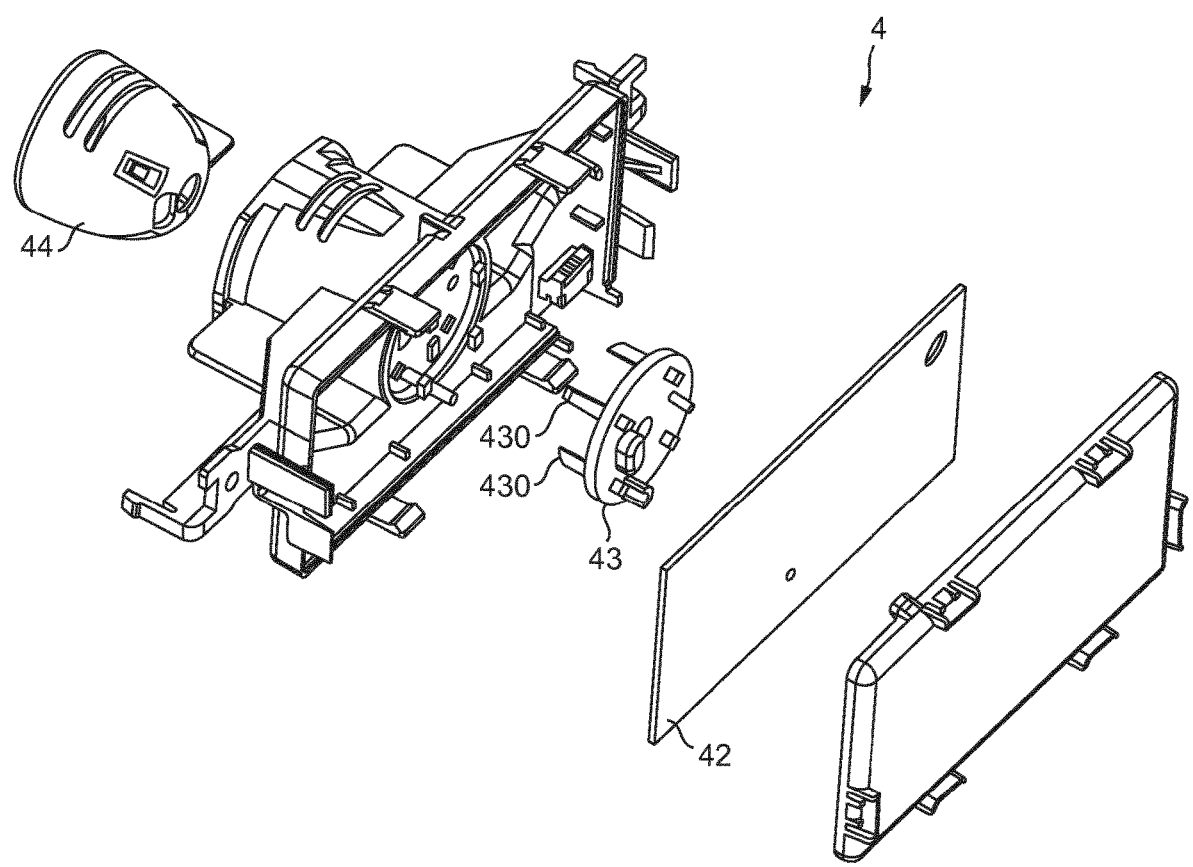
FIG. 5 is an exploded view of the capsule recognition module of FIG. 4.

FIG. 4 schematically illustrates an exemplary embodiment of a diffusor 44 comprising protruding elements 440 formed on its inner surface in order to prevent light, for example light guided by the light guide 43 and exiting the light guide 43 through the light guiding protrusions 430, from reaching directly the capsule recognition position 20.

In the illustrated embodiment, the light guide 44 forms a half-ellipsoidal cavity opening towards the capsule recognition position 20, the camera 41 being preferably located at the end opposite the capsule recognition position 41.

In the illustrated embodiment, the protruding elements 440 at least partly cover the extremities of the light guiding protrusions 430 of the light guide 43. The aim of the protruding elements 440 is to block light refracted out of the bevelled extremity of the light guiding protrusions 430 in a direction close to the longitudinal axis of the diffusor 44, in order to avoid that such light reaches the capsule recognition position 20 directly, i.e. without being first reflected at least once by the inner wall of the diffusor 44. The protruding elements 440 of the diffusor 44 however preferably comprise an opening configured to allow light refracted towards the inner wall of the diffusor 44 to enter the diffusor's cavity.

Optionally, the machine 1 comprises a capsule detector for detecting a capsule located in or approaching the capsule recognition position 20. The capsule detector is for example comprised in the capsule recognition module 4, preferably attached to, for example soldered on, the electronic board 42. Other dispositions of the capsule detector are however possible within the frame of the invention. The capsule detector may be of any appropriate type, for example a presence and/or movement detector, such as an infrared (IR) detector, an inductive and/or resistive detector, a mechanical switching element, etc. The capsule detector is for example controlled by the controller of the capsule recognition module 4 or directly controlled by the control unit of the machine.

In embodiments, when a capsule is approached to and/or placed in the capsule feeder 2 at the capsule recognition position 20, the capsule detector detects the presence of the capsule and sends a corresponding signal to the controller and/or to the machine's control unit, which activates the source of light 40 to illuminate at least part of the surface of the capsule located at the capsule recognition position 20. The camera 41 is in turn activated to capture an image of at least part of the illuminated capsule. The captured digital image is then fed to and treated by the neural network computing device in order to determine a type of the capsule. In other embodiments, for example if the machine does not comprise any capsule detector, the capsule recognition module 4, in particular the source of light 40 and the camera 41, is activated for example by a user actuation of the machine's user interface, for example by the actuation of a beverage selector.

Preferably, the camera 41 is a CCD sensor or any appropriate camera that provides a digital image of at least part of the capsule, for example a colour or a grey-scale image. The image is fed as input data to the neural network computing device that will run the neural network computer program using this input data, in order to determine the type of capsule, wherein the parameters of the neural network, in particular its synaptic weights and biases, have been previously set during training of the neural network implemented by the neural network computer program.

The neural network for determining a type of a capsule according to the invention is trained manually and/or automatically, for example on a training bench comprising a capsule feeder for feeding capsules of various types to one or more capsule recognition positions, each capsule recognition position of the training bench being provided with a camera for taking a picture of at least part of each capsule fed at the corresponding capsule recognition position. Preferably, the lighting and image capturing conditions in the capsule recognition positions of the training bench are similar to those at the capsule recognition position in the beverage preparation machine. The captured images are then fed as input to a computing device running the neural network computer program of the invention. The output of the program, i.e. of the neural network, for each image is compared with the actual type of the corresponding sample capsule and the result of the comparison is fed back to the program in order for it to adjust the neural network parameters, in particular the weights and/or biases of one or more synaptic connections.

Once a desired rate of successful recognition is achieved, the neural network is preferably considered as sufficiently trained and the neural network program with the adjusted parameters may be for example copied and loaded into neural network computing devices integrated or to be integrated into beverage preparation machines of the invention.

The neural network computer program of the invention may be updated to recognize a new type of capsule by a new training session according to the scheme described above, with capsules including capsules of the new type. Once the new type of capsule is learned by the neural network, the computer program with updated parameters may be copied and loaded into the neural network computing devices of functional machines for updating their capsule recognition module to the newer version. Optionally, one capsule type of the various recognized capsule types corresponds to capsules unknown to the machine.

Training of the neural network computer program of the invention is preferably performed on a training bench outside the beverage preparation machine. The conditions of capturing images of the sample capsules are however preferably similar or even identical to the conditions in the machine.

An example of a suitable architecture for the neural network implemented by the neural network computer program of the invention is summarized in the table below:

TABLE 1 example of a suitable neural network architecture

| | Layer Type | Ip | Op | Input size | Parameters | Operations |
|---|---|---|---|---|---|---|
| 1 | Convolution | 1 | 32 | 1 × 128 × 128 | 320 | 9652608 |
| 2 | ReLU | 32 | 32 | 1 × 126 × 126 | — | 508032 |
| 3 | Max-pooling | 32 | 32 | 1 × 126 × 126 | — | 508032 |
| 4 | Convolution | 32 | 32 | 1 × 63 × 63 | 9248 | 68704544 |
| 5 | ReLU | 32 | 32 | 1 × 61 × 61 | — | 119072 |

TABLE 1-continued example of a suitable neural network architecture

| | Layer Type | Ip | Op | Input size | Parameters | Operations |
|---|---|---|---|---|---|---|
| 6 | Max-pooling | 32 | 32 | 1 × 61 × 61 | — | 119072 |
| 7 | Convolution | 32 | 32 | 1 × 30 × 30 | 9248 | 14475776 |
| 8 | ReLU | 32 | 32 | 1 × 28 × 28 | — | 25088 |
| 9 | Max-pooling | 32 | 32 | 1 × 28 × 28 | — | 25088 |
| 10 | Linear | 1 | 1 | 6272 | 401408 | 802880 |
| 11 | ReLU | 1 | 1 | 64 | — | 64 |
| 12 | Linear | 1 | 1 | 64 | 704 | 1419 |
| | Total | | | | 421003 | 94941675 |

According to this example, the neural network is a convolutional neural network comprising twelve layers, with a first convolutional layer having an input size of 128×128×1. The neural network thus typically expects a 128 pixels by 128 pixels grey-scale image as its input and performs a 11-way classification. The neural network for example comprises five basic layers: three convolutional layers followed by two fully-connected ones. Every convolutional layer uses kernels of size 3×3×1 with a stride of 1 and no padding, to produce 32 output feature maps. Each convolution is followed by ReLU non-linearity and a max-pooling sub-sampling operation. The outputs of the feature extraction part are then fed into a two-layer fully-connected classifier, for example a LogSoftMax classifier. The hidden layer of the classifier is for example built from sixty-four neurons and uses a ReLU activation function as well.

Preferably, before the image data inputs are forwarded through the neural network of the invention, a three-step preprocessing is carried out on them. In a first preprocessing step, the data is preferably centered around zero by subtracting the mean activation calculated over the entire training set for each pixel. In a second preprocessing step, the data is divided by the global standard deviation of the data set in order to normalize the range of input values. In a third and last preprocessing step, a local contrast normalization is performed with a thirteen-by-thirteen Gaussian weighting window in order to amplify edges in the picture.

Other neural network architectures and/or data preprocessing are however possible within the frame of the invention in order to achieve a reliable capsule type recognition on the basis of a digital image of a capsule or at least part thereof.

The invention claimed is:

1. A machine for preparing and dispensing a beverage, the machine comprising:
an extraction unit configured for extracting a capsule to form the beverage;
a control unit configured for controlling the extraction unit to extract the capsule;
an outlet for dispensing the beverage formed by extracting the capsule to a user-receptacle,
a capsule recognition module for recognizing the capsule inserted in the machine at a capsule recognition position, the capsule recognition module comprising a camera for capturing a digital image of at least part of the capsule in the capsule recognition position; and
the capsule recognition module comprising a light source and a neural network computing device, the neural network computing device being configured to determine a type of the capsule amongst a plurality of predefined capsule types on the basis of the digital image of at least part of the capsule captured by the camera,
wherein lighting from the light source and image capture conditions in the capsule recognition position correspond to training conditions for which the neural network computing device is configured by training to recognize the capsule,
wherein the camera has a fixed position in an enclosure, the enclosure comprising an opening for receiving the capsule, the capsule recognition position arranged in the enclosure, and the light source configured to emit light to the capsule at the capsule recognition position.

2. The machine according to claim 1, wherein the plurality of predefined capsule types comprises a capsule type corresponding to capsules unknown to the capsule recognition module.

3. The machine according to claim 1, wherein the neural network computing device comprises a computing device selected from the group consisting of a microcontroller, a microprocessor and a combination thereof, and the neural network computing device further comprises a neural network computer program implementing a neural network when the neural network computer program is run on the computing device.

4. The machine according to claim 1, wherein the neural network computing device is a convolutional neural network computing device.

5. The machine according to claim 1, further comprising a network interface.

6. The machine according to claim 1, wherein the neural network computing device is configurable and/or can be updated remotely over the network interface.

7. The machine according to claim 1, wherein the capsule recognition module comprises a diffusor for diffusing the light of the light source towards the capsule recognition position.

8. The machine according to claim 7, the diffusor forming a tapered cavity extending from the camera to the capsule recognition position and opening towards the capsule recognition position.

9. A method of configuring a neural network computing device of a machine for preparing and dispensing a beverage, the machine comprising
an extraction unit for extracting a capsule to form the beverage,
a control unit for controlling the extraction unit to extract the capsule,
an outlet for dispensing the beverage formed by extracting the capsule to a user-receptacle,
a capsule recognition module for recognizing the capsule inserted in the machine at a capsule recognition position, the capsule recognition module comprising a light source,
a camera for capturing an image of at least part of the capsule in the capsule recognition position, wherein lighting from the light source and image capturing conditions in the capsule recognition position correspond to training conditions for which the neural network computing device is trained to recognize the capsule, the neural network computing device being configured to determine a type of capsule amongst a plurality of predefined capsule types on the basis of the image of at least part of the capsule captured by the camera, wherein the camera has a fixed position in an enclosure, the enclosure comprising an opening for receiving the capsule, the capsule recognition position arranged in the enclosure, and the light source configured to emit light to the capsule at the capsule recognition position, the method comprising:

training a neural network computer program outside of the neural network computing device by inputting several images of capsules of the plurality of predetermined types until the neural network correctly determines the type of each next capsule image with a probability higher than a predetermined threshold;

copying the trained neural network computer program into the neural network computing device of the machine; and controlling, by the control unit, a liquid supplier according to a liquid supply program associated with the type of the capsule determined by the neural network.

10. The method of updating the neural network computing device of the machine according to claim 9, the method comprising:

training the neural network computer program outside of the neural network computing device by inputting several images of capsules of the predetermined types, the predetermined types comprising a new, previously unknown type, until the neural network correctly determines the type of each next capsule image with a probability higher than a predetermined threshold; and copying the trained neural network computer program into the neural network computing device of the machine.

11. The method according to claim 10, the step of copying being performed over a data network.

12. A non-transitory computer readable medium comprising:

a neural network computer program configured for determining a type of a capsule amongst a plurality of predefined capsule types, on the basis of a digital image of at least part of the capsule captured by a camera of a capsule recognition module of a beverage preparation machine, wherein the capsule recognition module comprises a light source, and lighting from the light source and image capturing conditions in the capsule recognition position correspond to training conditions for which the neural network is configured by training to recognize the capsule, wherein the camera has a fixed position in an enclosure, the enclosure comprising an opening for receiving the capsule, the capsule recognition position arranged in the enclosure, and the light source configured to emit light to the capsule at the capsule recognition position; and the neural network computer program configured to control the beverage preparation machine according to a liquid supply program associated with the type of the capsule determined by the neural network.

13. The non-transitory computer readable medium according to claim 12, implementing a convolutional neural network when the neural network computer program is configured to run on a computing device.

14. The non-transitory computer readable medium according to claim 13, wherein the convolutional neural network comprises at least one convolutional layer and at least one fully connected classification layer.

15. The non-transitory computer readable medium according to claim 13, wherein the convolutional neural network comprises three convolutional layers, each followed by a pooling layer, and a two-layer fully-connected classifier.

16. The machine according to claim 1, wherein the camera of the capsule recognition module is a charged-coupled device ("CCD") camera and the light source comprises at least one light emitting diode ("LED").

17. The machine according to claim 1, wherein the capsule recognition module is configured to identify the capsule based on specific characters and/or drawings formed on the capsule.

18. A system comprising the machine of claim 1 and further comprising one or more predefined capsule types configured for recognizing by the capsule recognition module of the machine.

19. A method of recognizing the capsule with the machine of claim 1, the method comprising:

inserting the capsule in the machine at the capsule recognition position;

capturing the image of at least part of the capsule in the capsule recognition position; and determining the type of the capsule amongst the plurality of predefined capsule types based on the image of at least part of the capsule captured by the camera.

20. The method according to claim 19, wherein the type of the capsule corresponds to a particular type of coffee which differs from coffee contained in capsules of other types in the plurality of predefined capsule types by at least one of an origin, a roasting degree, a grounding level, a quantity contained in the capsule, or a caffeine content.

21. The machine according to claim 1, wherein the digital image includes a plurality of pixels each having a corresponding color value.

22. A machine for preparing and dispensing a beverage, the machine comprising:

an extraction unit for extracting a beverage ingredient capsule to form the beverage;

a control unit for controlling the extraction unit to extract the capsule;

an outlet for dispensing the beverage formed by extracting the capsule to a user-receptacle;

a capsule recognition module for recognizing a capsule inserted in the machine at a capsule recognition position, the capsule recognition module comprising a camera for capturing an image of at least part of the capsule in the capsule recognition position, wherein the capsule recognition module further comprises a neural network computing device configured to determine a type of the capsule amongst a plurality of predefined capsule types on the basis of an image of at least part of the capsule captured by the camera, wherein the camera has a fixed position in an enclosure, the enclosure comprising an opening for receiving a capsule, and the capsule recognition position arranged in the enclosure, and a light source configured to emit light to the capsule at the capsule recognition position; and a user interface positioned on a front of the machine or a machine head of the machine.

* * * * *